US012666472B2

(12) United States Patent (10) Patent No.: US 12,666,472 B2
Kishida et al. (45) Date of Patent: Jun. 23, 2026

(54) WIRELESS APPARATUS AND COMMUNICATION METHOD

(71) Applicant: NTT, Inc., Tokyo (JP)

(72) Inventors: Akira Kishida, Musashino (JP); Kengo Nagata, Musashino (JP); Yasuhiko Inoue, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 427 days.

(21) Appl. No.: 18/030,220

(22) PCT Filed: Oct. 13, 2020

(86) PCT No.: PCT/JP2020/038623
§ 371 (c)(1),
(2) Date: Apr. 4, 2023

(87) PCT Pub. No.: WO2022/079803
PCT Pub. Date: Apr. 21, 2022

(65) Prior Publication Data
US 2023/0379986 A1 Nov. 23, 2023

(51) Int. Cl.
*H04W 4/00* (2018.01)
*H04W 76/11* (2018.01)
(52) U.S. Cl.
CPC .................................. *H04W 76/11* (2018.02)
(58) Field of Classification Search
CPC ... H04W 76/11; H04W 28/082; H04W 28/09; H04W 84/12; H04W 76/15
See application file for complete search history.

(56) References Cited

U.S. PATENT DOCUMENTS

| | | | |
|---|---|---|---|
| 5,774,808 A | 6/1998 | Sarkioja et al. | |
| 2002/0090946 A1 | 7/2002 | Mielke et al. | |
| 2017/0272214 A1 | 9/2017 | Chen et al. | |
| 2021/0014911 A1 * | 1/2021 | Patil ...................... | H04L 1/1621 |
| 2021/0377851 A1 * | 12/2021 | Liu .................... | H04W 28/0263 |
| 2022/0312522 A1 * | 9/2022 | Jang ...................... | H04L 1/1621 |

OTHER PUBLICATIONS

IEEE Std 802. 11-2016, "10.22.2 HCF contention based channel access (EDCA)", Dec. 7, 2016.

* cited by examiner

*Primary Examiner* — Omoniyi Obayanju
(74) *Attorney, Agent, or Firm* — Harness, Dickey & Pierce, P.L.C.

(57) ABSTRACT

A wireless apparatus according to an embodiment of the present invention includes: first and second processing units configured to transmit and receive wireless signals using different channels; and a link management unit configured to manage a first link between the first processing unit and a terminal and a second link between the second processing unit and the terminal, in which the link management unit receives a request signal requesting data exchange relating to a first traffic identifier from the terminal, associates the first traffic identifier with the second link based on the request signal, and when a second traffic identifier different from the first traffic identifier is associated with the second link, changes the association of the second traffic identifier from the second link to the first link based on the request signal.

4 Claims, 14 Drawing Sheets

|  | LINK | CHANNEL | MULTI-LINK | TID |
|---|---|---|---|---|
| STA1 | PRESENCE | 6GHz 1ch | ◯ ANCHOR | #1 |
| STA2 | PRESENCE | 5GHz 3ch | ◯ LL | #2 |
| STA3 | NONE | – | – | – |

OCCURRENCE OF RTA TRAFFIC (#3)

221

|  | LINK | CHANNEL | MULTI-LINK | TID |
|---|---|---|---|---|
| STA1 | PRESENCE | 6GHz 1ch | ◯ ANCHOR | #1, #2 |
| STA2 | PRESENCE | 5GHz 3ch | ◯ LL | #3 |
| STA3 | NONE | – | – | – |

| | LINK | CHANNEL | MULTI-LINK | TERMINAL | TID |
|---|---|---|---|---|---|
| STA1 | PRESENCE | 6GHz 1ch | O ANCHOR | a | #1 |
| | | | | b | #1 |
| | | | | c | #1 |
| STA2 | PRESENCE | 5GHz 3ch | O LL | a | #2 |
| | | | | b | — |
| | | | | c | #2 |
| STA3 | NONE | — | — | — | — |

⬇ OCCURRENCE OF RTA TRAFFIC (a #3)

121

| | LINK | CHANNEL | MULTI-LINK | TERMINAL | TID |
|---|---|---|---|---|---|
| STA1 | PRESENCE | 6GHz 1ch | O ANCHOR | a | #1, #2 |
| | | | | b | #1 |
| | | | | c | #1, #2 |
| STA2 | PRESENCE | 5GHz 3ch | O LL | a | #3 |
| | | | | b | — |
| | | | | c | — |
| STA3 | NONE | — | — | — | — |

Fig 12

| ML Capability | Operational parameter | LL LINK IDENTIFIER | LL TRAFFIC |
| --- | --- | --- | --- |
|  |  |  |  |

WIRELESS APPARATUS AND COMMUNICATION METHOD

CROSS REFERENCE TO RELATED APPLICATIONS

This application is a U.S. National Phase application under 35 U.S.C. 371 of International Application No. PCT/JP2020/038623 filed on Oct. 13, 2020. The entire disclosure of the above application is incorporated herein by reference.

TECHNICAL FIELD

The present invention relates to a wireless communication technique.

BACKGROUND ART

Wireless local area networks (LANs) are known as wireless systems which wirelessly connect access points and terminals.

Wireless LAN access points and terminals access channels using carrier sense multiple access with collision avoidance (CSMA/CA) or enhanced distribution channel access (EDCA) which is an access control method in which CSMA/CA is extended, to transmit data. EDCA classifies data to be transmitted into access categories VO, VI, BE, and BK. Access parameters are assigned to the access categories VO, VI, BE, and BK so that transmission is prioritized in the order of VO, VI, BE, and BK.

Real-time applications (RTAs) such as network games and industrial robots generate traffic with absolute latency or jitter requirements. For example, traffic requiring a low latency occurs. EDCA may not be able to satisfy these requirements.

CITATION LIST

Non Patent Literature

NPL 1: IEEE Std 802.11-2016, "10.22.2 HCF contention based channel access (EDCA)", 7 Dec. 2016.

SUMMARY OF THE INVENTION

Technical Problem

An object of the present invention is to provide a technique for improving communication latency between an access point and a terminal.

Solution to Problem

A wireless apparatus according to an embodiment of the present invention includes: a first wireless signal processing unit configured to transmit and receive a wireless signal using a first channel; a second wireless signal processing unit configured to transmit and receive a wireless signal using a second channel different from the first channel; and a link management unit configured to manage a first link being a link between the first wireless signal processing unit and the first terminal and a second link being a link between the second wireless signal processing unit and the first terminal, in which the link management unit receives a first request signal requesting data exchange relating to a first traffic identifier from the first terminal, associates the first traffic identifier with the second link based on the first request signal, and when a second traffic identifier different from the first traffic identifier is associated with the second link, changes the association of the second traffic identifier from the second link to the first link based on the first request signal.

Advantageous Effects of the Invention

According to the present invention, there is provided a technique for improving communication latency between an access point and a terminal.

BRIEF DESCRIPTION OF DRAWINGS

FIG. 9 is a diagram showing link management information shown in FIG. 6.

FIG. 10 is a diagram showing link management information shown in FIG. 4.

FIG. 12 is a diagram showing a Frame Body field in a beacon frame transmitted using a beacon management unit shown in FIG. 4.

DESCRIPTION OF EMBODIMENTS

Embodiments of the present invention will be described below with reference to the drawings.

Figure 1:
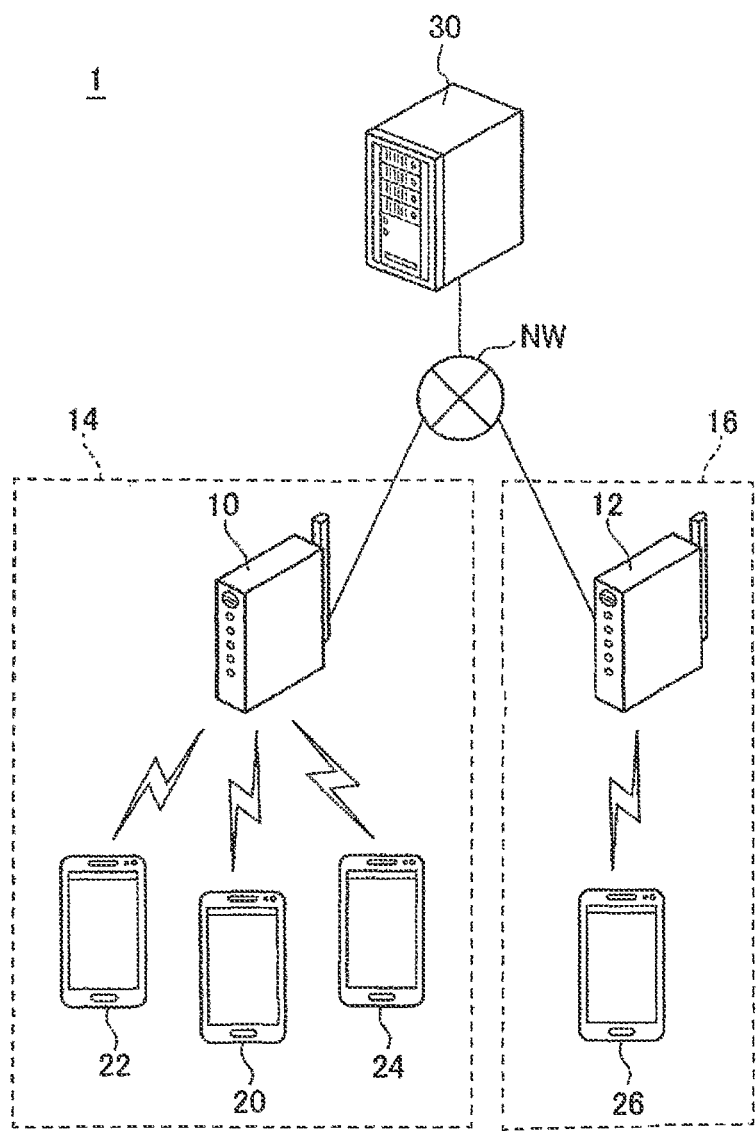
FIG. 1 is a diagram showing a communication system according to an embodiment of the present invention.

FIG. 1 schematically shows a communication system 1 according to an embodiment of the present invention. As shown in FIG. 1, the communication system 1 includes an access point 10, a terminal 20, and a server 30.

The access point 10 functions as a wireless LAN access point (AP). The access point 10 is connected to a network NW such as the Internet. The access point 10 may be connected to a terminal 20 using one channel or a plurality of different channels. In this specification, the wireless connection between the access point 10 and the terminal 20 using a plurality of different channels is referred to as a "multi-link". Communication between the access point 10 and the terminal 20 is based on, for example, the IEEE 802.11 standard.

The terminal 20 is a wireless terminal apparatus having a wireless communication function. The terminal 20 may be a portable terminal such as a smartphone, a tablet, or a notebook computer. The terminal 20 may be a stationary terminal such as a desktop personal computer. The terminal 20 accesses the network NW via the access point 10. For example, the terminal 20 exchanges data with the server 30 via the access point 10.

The data communication between the access point 10 and the terminal 20 is based on an open systems interconnection (OSI) reference model. In the OSI reference model, the communication function has 7 layers (first layer: physical layer, second layer: data link layer, third layer: network layer, fourth layer: transport layer, fifth layer: session layer, sixth layer: presentation layer, and seventh layer: application layer). Furthermore, the data link layer includes, for example, a logical link control (LLC) layer and a media access control (MAC) layer. In the LLC layer, for example, a destination service access point (DSAP) header, a source service access point (SSAP) header, and the like are added to data input from a higher-level application to form an LLC packet. In the MAC layer, for example, a MAC header is added to an LLC packet to form a MAC frame.

The server 30 can hold various information and holds content data for, for example, the terminal 20. The server 30 is connected to the network NW and is configured to communicate with the access point 10 via the network NW. The communication between the access point 10 and the server 30 may be wired communication, wireless communication, or a combination thereof.

The communication system 1 may further include an access point 12 and terminals 22, 24, and 26. The terminals 22 and 24 are connected to the access point 10. The terminal 26 is connected to the access point 12 and the access point 12 is connected to the network NW. The access point 12 is located in the area at which a wireless signal from the access point 10 arrives. The access points 10 and 12 form basic service sets (BSS) 14 and 16. The BSS 14 includes the access point 10 and the terminals 20, 22, and 24 and the BSS 16 includes the access point 12 and the terminal 26.

The access point 12 can have the same configuration as the access point 10. Therefore, the access point 10 will be described as a representative and the description of the access point 12 will be omitted. The terminals 22, 24, and 26 can have the same configuration as the terminal 20. Therefore, the terminal 20 will be described as a representative and the description of the terminals 22, 24, and 26 will be omitted.

Figure 2:
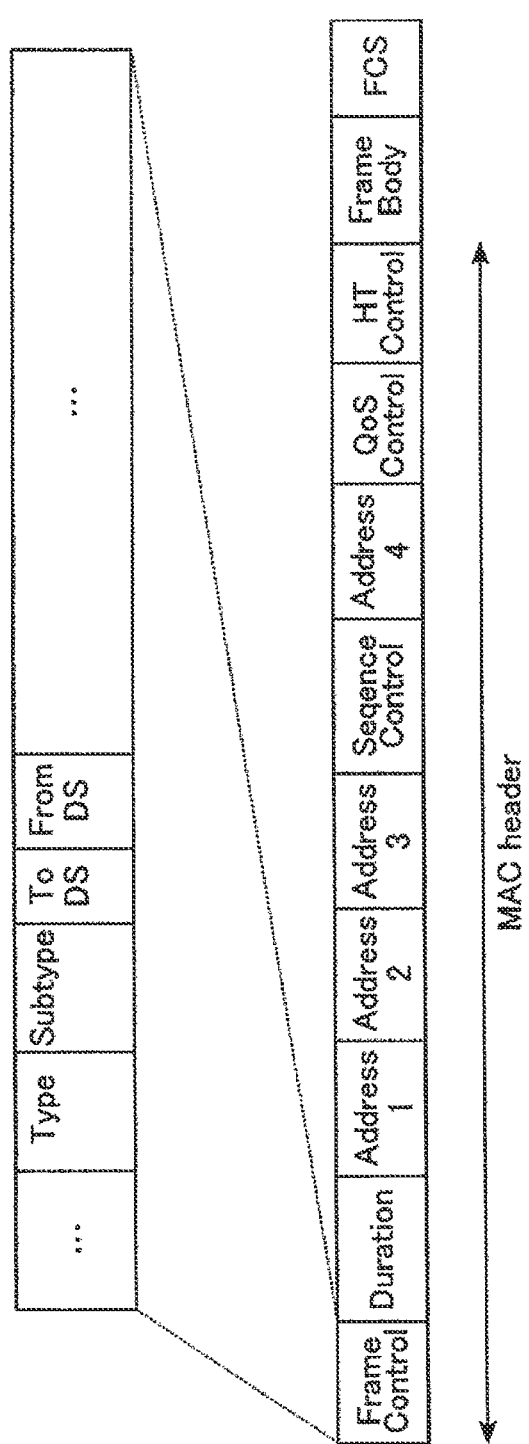
FIG. 2 is a diagram showing a format of a MAC frame used in the communication system of FIG. 1.

FIG. 2 shows an example of a format of a MAC frame used in the communication between the access point 10 and the terminal 20. As shown in FIG. 2, examples of a field included in the MAC frame include a Frame Control field, a Duration field, an Address1 field, an Address2 field, an Address3 field, a Sequence Control field, an Address4 field, a quality of service (QoS) Control field, an HT Control field, a Frame Body field, and an frame check sequence (FCS) field. These fields may or may not be included depending on the type of wireless frame.

The Frame Control field to the HT Control field correspond to the MAC header. The Frame Body field corresponds to the MAC payload. The FCS field stores an error detection code used for error detection for the MAC header and Frame Body fields.

The Frame Control field contains various control information such as a Type value, a Subtype value, a To distribution system (To DS) value, and a From DS value.

The Type value indicates whether the MAC frame is a management frame, a control frame, or a data frame. The Subtype value indicates a frame type of the MAC frame at the time of being used in combination with the Type value. For example, "00/1000 (Type value/Subtype value)" indicates that the MAC frame is a beacon signal. Furthermore, "00/0100 (Type value/Subtype value)" indicates that the MAC frame is a probe request. In addition, "00/0101 (Type value/Subtype value)" indicates that the MAC frame is a probe response.

The To DS value and the From DS value have different meanings depending on the combination. For example, when the MAC frame is a data frame, the To DS value "0" indicates that the receiving station is a terminal and "1" indicates that the receiving station is an access point. Furthermore, when the MAC frame is a data frame, the From DS value "0" indicates that the transmitting station is a terminal and "1" indicates that the transmitting station is an access point. On the other hand, the To DS value and the From DS value when the MAC frame is a management frame or a control frame are fixed to, for example, "0".

The Duration field indicates how long the wireless line will be used. The Address field indicates a BSSID, a source MAC address, a destination MAC address, a sender terminal address, a receiver terminal address, and the like. The number of Address fields used depends on the frame type. The Sequence Control field indicates the sequence number of the MAC frame and the fragment number for the fragment. The QoS Control field is used for the QoS function in the MAC frame. The QoS Control field may include a Traffic Identifier (TID) subfield. The HT Control field is a Control field for high throughput features. The Frame Body field includes information according to the frame type. For example, when the frame type is a data frame, the transmission data is stored in the Frame Body field.

Figure 3:
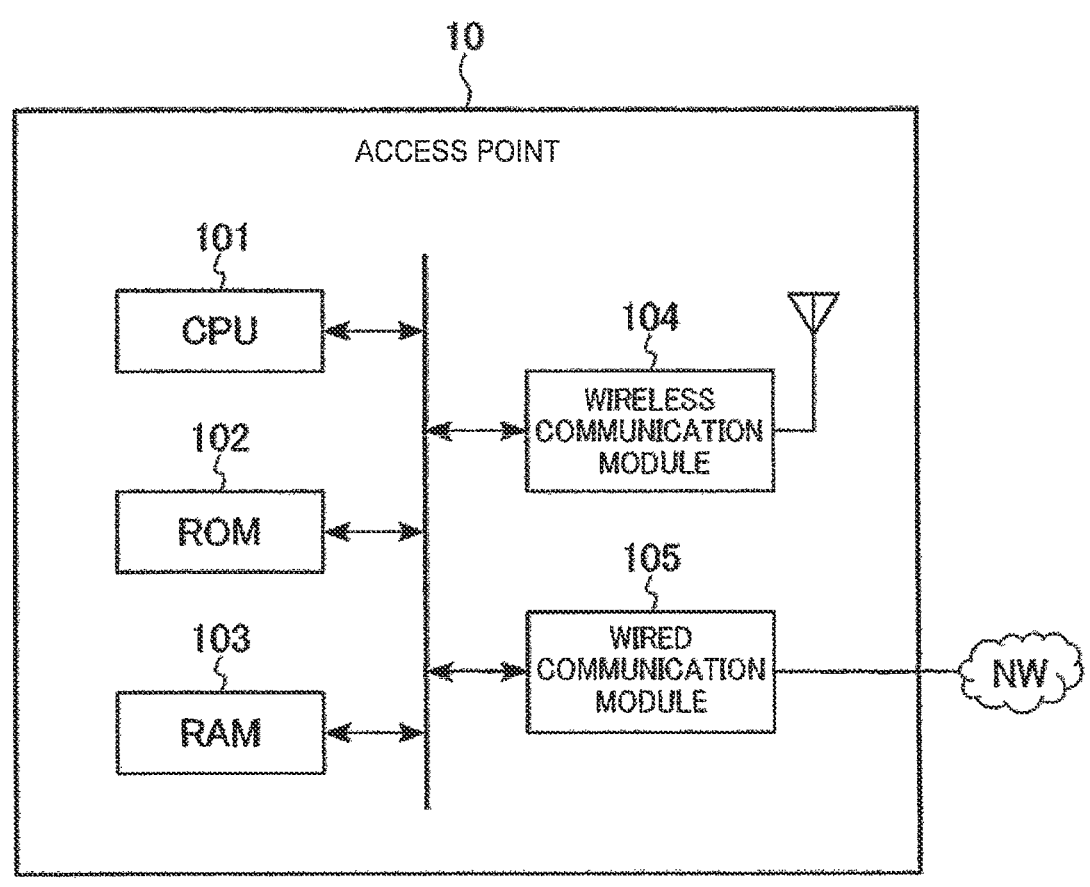
FIG. 3 is a block diagram showing a hardware configuration of an access point shown in FIG. 1.

FIG. 3 shows an example of the hardware configuration of the access point 10. As shown in FIG. 3, the access point 10 includes a central processing unit (CPU) 101, a read only memory (ROM) 102, a random access memory (RAM) 103, a wireless communication module 104, and a wired communication module 105.

The CPU 101 is a circuit capable of executing various programs and controls the overall operation of the access point 10. The ROM 102 is a non-volatile semiconductor memory and stores a program for controlling the access point 10, control data, and the like. The RAM 103 is, for example, a volatile semiconductor memory and is used as a working region of the CPU 101. The wireless communication module 104 is a circuit used for transmitting and receiving data using a wireless signal and is connected to an antenna. The wireless communication module 104 may include an antenna. Also, the wireless communication module 104 includes a plurality of communication modules corresponding to a plurality of frequency bands, respectively. The wired communication module 105 is a circuit used for transmitting and receiving data by a wired signal and is connected to a network NW.

Figure 4:
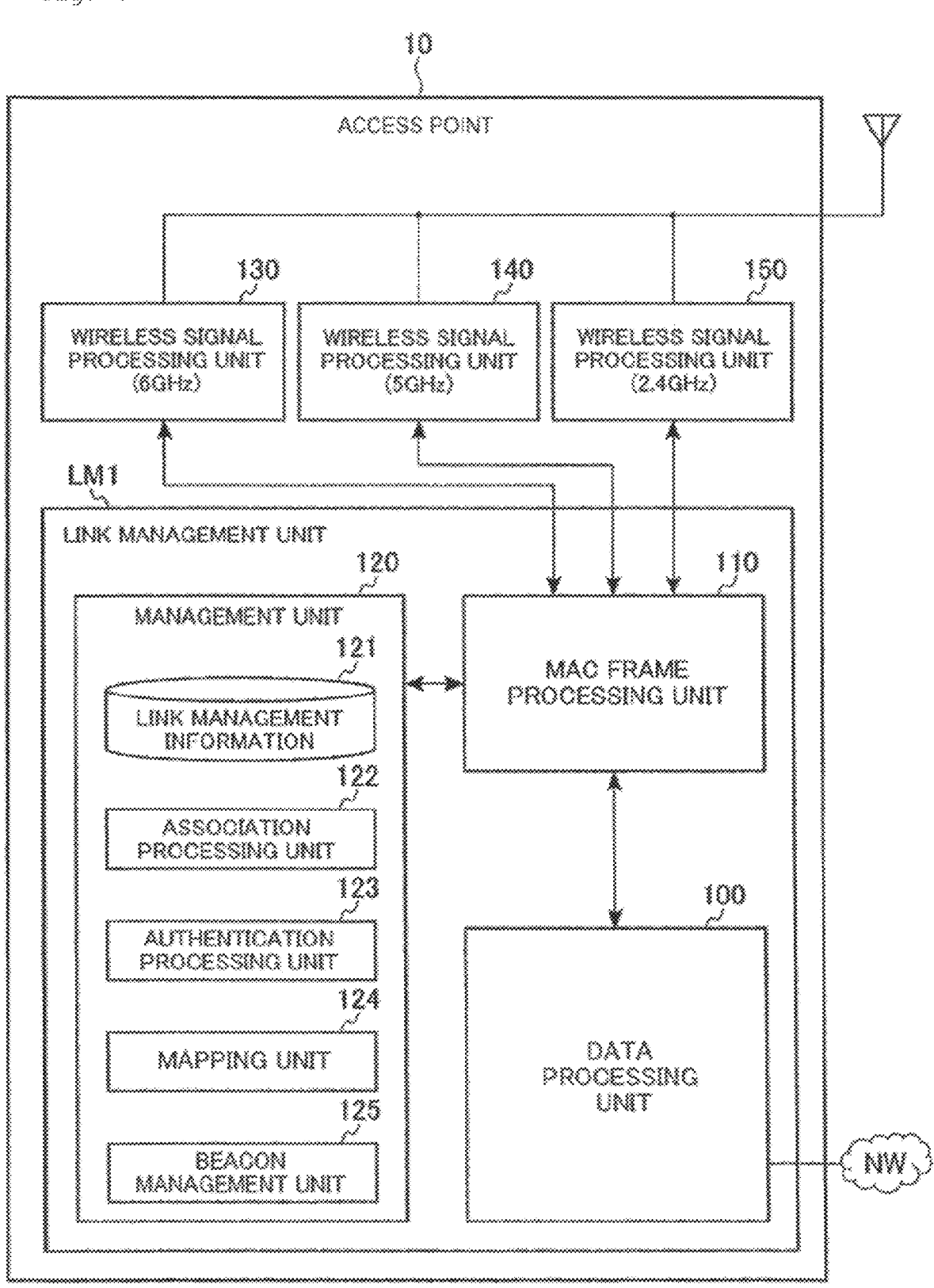
FIG. 4 is a block diagram showing a function configuration of the access point shown in FIG. 1.

FIG. 4 shows an example of the functional configuration of the access point 10. As shown in FIG. 4, the access point 10 includes a data processing unit 100, a MAC frame processing unit 110, a management unit 120, and wireless signal processing units 130, 140, and 150. The data processing unit 100, the MAC frame processing unit 110, and the management unit 120 are collectively referred to as the link management unit LM1. The processes described with respect to the data processing unit 100, the MAC frame processing unit 110, the management unit 120, and the wireless signal processing units 130, 140, and 150 are realized using, for example, the CPU 101 and the wireless communication module 104.

The data processing unit 100 can perform the processing of the LLC layer and the processing of the upper layer on the input data. For example, the data processing unit 100 transmits data received from a computer on the network NW to the MAC frame processing unit 110. Furthermore, the data processing unit 100 transmits the data received from the MAC frame processing unit 110 to a computer on the network NW.

The MAC frame processing unit 110 performs processing of the MAC layer on the input data. The MAC frame processing unit 110 generates a MAC frame from the data input from the data processing unit 100. The MAC frame processing unit 110 generates a MAC frame including data input from the management unit 120 (for example, a response signal which will be described later). Furthermore, the MAC frame processing unit 110 restores data from MAC frames input from each of the wireless signal processing units 130, 140, and 150. The MAC frame processing unit 110 transmits the restored data to the management unit 120 when the restored data is control data (for example, a request signal which will be described later) The process of generating a MAC frame from data and the process of restoring data from a MAC frame may be based on the IEEE 802.11 standard.

The management unit 120 manages links with each terminal based on the notifications received from the wireless signal processing units 130, 140, and 150 via the MAC frame processing unit 110. The management unit 120 includes the link management information 121. The link management information 121 is stored in, for example, the RAM 103, and includes information about a terminal wirelessly connected to the access point 10 (for example, each of the terminals 20, 22, and 24 shown in FIG. 1).

The management unit 120 further includes an association processing unit 122 and an authentication processing unit 123. The association processing unit 122 performs a protocol relating to the association when a connection request is received from the terminal via any of the wireless signal processing units 130, 140, and 150. The authentication processing unit 123 performs a protocol related to authentication after the association is completed.

The wireless signal processing units 130, 140, and 150 transmit and receive wireless signals using different channels. For example, the wireless signal processing unit 130 handles a wireless signal in the 6 GHz band, the wireless signal processing unit 140 handles a wireless signal in the 5 GHz band, and the wireless signal processing unit 150 handles a wireless signal in the 2.4 GHz band. The wireless signal processing units 130, 140, and 150 share the antenna of the access point 10. In other embodiments, the wireless signal processing units 130, 140, and 150 may use individual antennas.

The wireless signal processing units 130, 140, and 150 are used for communication with the terminal. For example, each of the wireless signal processing units 130, 140, and 150 adds a preamble, a PHY header, and the like to the MAC frame input from the MAC frame processing unit 110 to generate a wireless frame. Furthermore, each of the wireless signal processing units 130, 140, and 150 converts the wireless frame into a wireless signal and transmits the wireless signal via the antenna of the access point 10. In addition, each of the wireless signal processing units 130, 140, and 150 converts the wireless signal received via the antenna of the access point 10 into a wireless frame. Moreover, each of the wireless signal processing units 130, 140, and 150 extracts a MAC frame from the wireless frame and sends the extracted MAC frame to the MAC frame processing unit 110.

In this way, each of the wireless signal processing units 130, 140, and 150 may perform a part of the processing of the MAC layer and the processing of the first layer on the input data or the wireless signal.

Each of the wireless signal processing units 130, 140, and 150 is associated with a traffic identifier (TID) for each terminal. For example, with regard to the terminal 20, TID #1 is associated with the wireless signal processing unit 130. In this case, the wireless signal processing unit 130 is used for exchanging data relating to TID #1 with the terminal 20. For example, when the data processing unit 100 receives data addressed to the terminal 20 relating to TID #1 from the server 30, the MAC frame processing unit 110 generates a MAC frame including the data and transmits the MAC frame to the terminal 20 through the wireless signal processing unit 130. Furthermore, the MAC frame processing unit 110 receives a MAC frame including data relating to TID #1 from the terminal 20 through the wireless signal processing unit 130. The information regarding the association of the TID is included in the link management information 121.

The management unit 120 sets the attribute relating to the multi-link to the link. Examples of attributes include anchors and low latency (LL). The link set in the anchor is called an anchor link and the link set in the LL is called an LL link. In addition to transmitting and receiving assigned data, the anchor link transmits and receives control information relating to the operation of the multi-link. LL links are used for data exchange relating to a predetermined TID. The predetermined TID indicates a traffic identifier assigned to a traffic to be processed with the highest priority such as a real time application (RTA) traffic. The predetermined TID corresponds to the access category LL which will be described later. In other words, the data relating to the predetermined TID is classified into the access category LL. The LL link may be used exclusively for exchanging data relating to TID #3 when there is traffic relating to TID #3 which is a predetermined TID and used for data exchange relating to other TIDs in the absence of traffic relating to TID #3. The management unit 120 uses the MAC frame processing unit 110 to transmit attribute information indicating an attribute to be set in the link to the terminal. For example, the attribute information may be included in the probe response which will be described later.

The management unit 120 further includes a mapping unit 124. The mapping unit 124 controls the association of TIDs in response to a request from a terminal connected by a multi-link. For example, the mapping unit 124 receives a request signal requesting data exchange relating to TID #3 from the terminal 20. Specifically, the MAC frame processing unit 110 receives a request signal from the terminal 20 and transmits the received request signal to the mapping unit 124. Upon receiving the request signal from the terminal 20, the mapping unit 124 changes the TID association so that the LL link is exclusively used for data exchange related to TID #3. The request signal can be, for example, a type of management frame.

The management unit 120 further includes a beacon management unit 125. The beacon management unit 125 transmits a beacon signal for each channel (link). The beacon management unit 125 generates a beacon signal for each channel and transmits the beacon signal to the wireless signal processing unit corresponding to the channel of the wireless signal processing units 130, 140, and 150 via the MAC frame processing unit 110. The wireless signal processing unit periodically broadcasts the beacon signal. In another embodiment, the beacon management unit 125 may transmit the beacon signal on a single channel used as an anchor link.

The mapping unit 124 and the beacon management unit 125 will be described in detail later.

Figure 5:
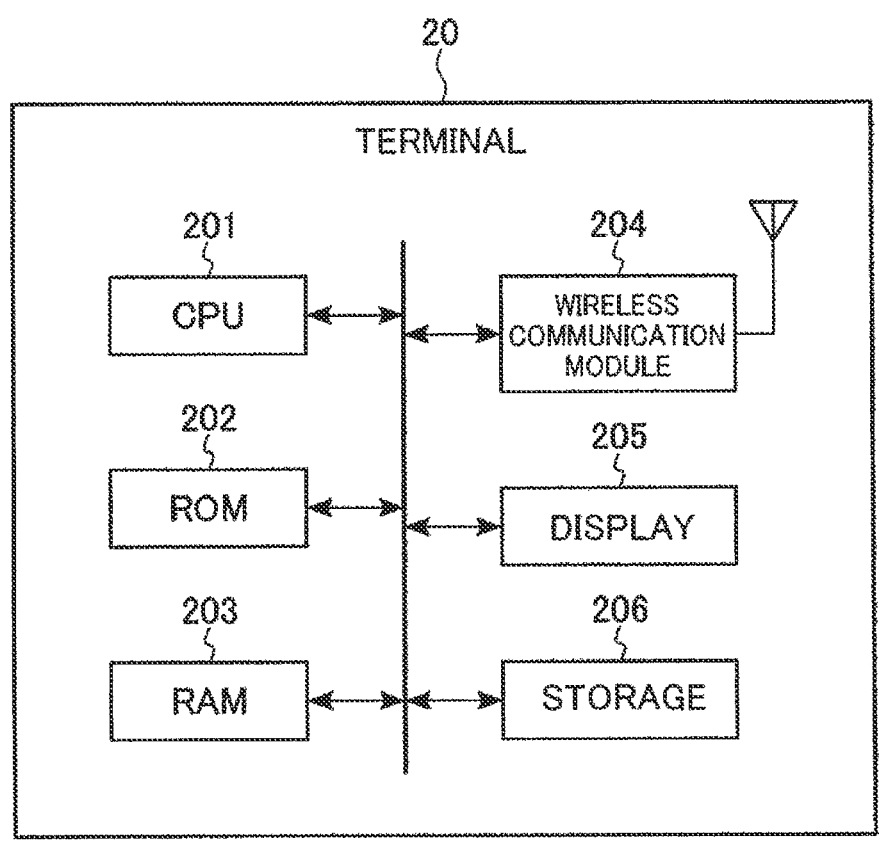
FIG. 5 is a block diagram showing a hardware configuration of a terminal shown in FIG. 1.

FIG. 5 shows an example of the hardware configuration of the terminal 20. As shown in FIG. 5, the terminal 20 includes a CPU 201, a ROM 202, a RAM 203, a wireless communication module 204, a display 205, and a storage 206.

The CPU 201 is a circuit capable of executing various programs and controls the overall operation of the terminal 20. The ROM 202 is a non-volatile semiconductor memory and stores a program for controlling the terminal 20, control data, and the like. The RAM 203 is, for example, a volatile semiconductor memory and is used as a working area of the CPU 201. The wireless communication module 204 is a circuit used for transmitting and receiving data by a wireless signal and is connected to an antenna. The wireless communication module 204 may include an antenna. Furthermore, the wireless communication module 204 includes, for example, a plurality of communication modules corresponding to a plurality of frequency bands. For example, the display 205 displays an image such as a graphical user interface (GUI) corresponding to the application software. The display 205 may have a function as an input interface of the terminal 20. For example, the touch panel may be provided on the display 205. The terminal 20 may not have to have a display. The storage 206 is a non-volatile storage device and stores, for example, the system software of the terminal 20.

Figure 6:
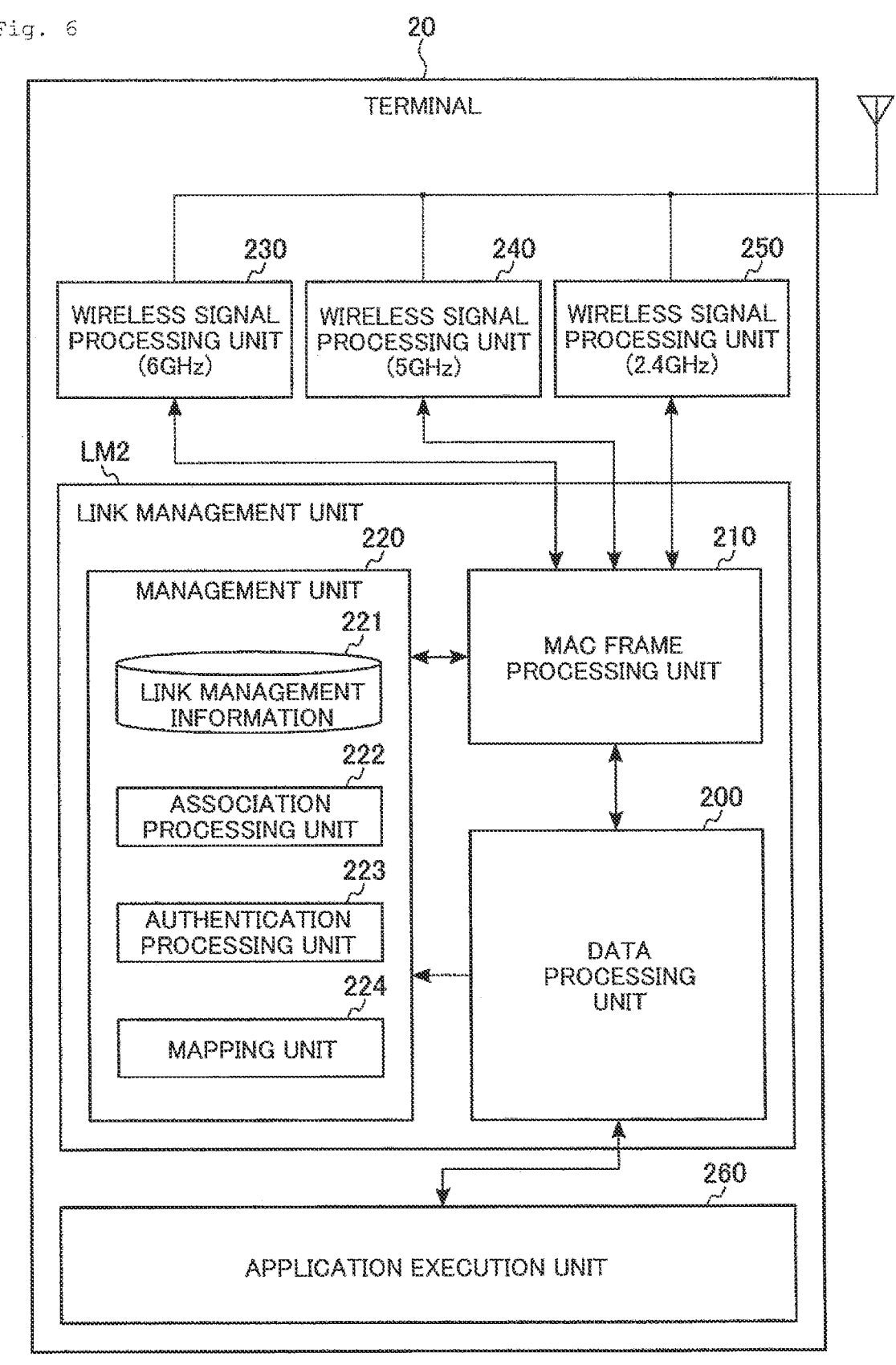
FIG. 6 is a block diagram showing a function configuration of the terminal shown in FIG. 1.

FIG. 6 shows an example of the function configuration of the terminal 20. As shown in FIG. 6, the terminal 20 includes a data processing unit 200, a MAC frame processing unit 210, a management unit 220, a wireless signal processing unit 230, 240, and 250, and an application execution unit 260. The data processing unit 200, the MAC frame processing unit 210, and the management unit 220 are collectively referred to as the link management unit LM2. The processes described with respect to the data processing unit 200, the MAC frame processing unit 210, the management unit 220, and the wireless signal processing units 230, 240, 250 are realized using, for example, the CPU 201 and the wireless communication module 204.

The data processing unit 200 may perform the processing of the LLC layer and the processing of the upper layer on the input data. For example, the data processing unit 200 transmits the data received from the application execution unit 260 to the MAC frame processing unit 210. Also, the data processing unit 200 transmits the data received from the MAC frame processing unit 210 to the application execution unit 260.

The MAC frame processing unit 210 performs the processing of the MAC layer on the input data. The MAC frame processing unit 210 generates a MAC frame from the data input from the data processing unit 200. The MAC frame processing unit 210 generates a MAC frame including data input from the management unit 220 (for example, a request signal which will be described later). Furthermore, the MAC frame processing unit 210 restores data from MAC frames input from each of the wireless signal processing units 230, 240, and 250. The MAC frame processing unit 210 transmits the restored data to the management unit 220 when the restored data is control data (for example, a response signal which will be described later) The process of generating a MAC frame from data and the process of restoring data from a MAC frame may be based on the IEEE802.11 standard.

The management unit 220 manages the link with the access point based on the notification received from the wireless signal processing units 230, 240, and 250 via the MAC frame processing unit 210. The management unit 220 includes the link management information 221. The link management information 221 is stored in, for example, the RAM 203, and includes information about an access point wirelessly connected to the terminal 20 (for example, the access point 10 shown in FIG. 1).

The management unit 220 further includes an association processing unit 222 and an authentication processing unit 223. The association processing unit 222 performs a protocol relating to the association. For example, the association processing unit 222 transmits a connection request to the access point 10 via any of the wireless signal processing units 230, 240, and 250. The authentication processing unit 223 performs a protocol relating to authentication after the association is completed.

The wireless signal processing units 230, 240, and 250 transmit and receive wireless signals using different channels. For example, the wireless signal processing unit 230 handles a wireless signal in the 6 GHz band, the wireless signal processing unit 240 handles a wireless signal in the 5 GHz band, and the wireless signal processing unit 250 handles a wireless signal in the 2.4 GHz band. The wireless signal processing units 230, 240, and 250 share the antenna of the terminal 20. In other embodiments, the wireless signal processing units 230, 240, and 250 may use individual antennas.

The wireless signal processing units 230, 240, and 250 are used for communication with the access point. For example, each of the wireless signal processing units 230, 240, and 250 adds a preamble, a PHY header, and the like to the MAC frame input from the MAC frame processing unit 210 to generate a wireless frame. Furthermore, each of the wireless signal processing units 230, 240, and 250 converts the wireless frame into a wireless signal and transmits the wireless signal via the antenna of the terminal 20. In addition, each of the wireless signal processing units 230, 240, and 250 converts the wireless signal received via the antenna of the terminal 20 into a wireless frame. Moreover, each of the wireless signal processing units 230, 240, and 250 extracts a MAC frame from the wireless frame and transmits the extracted MAC frame to the MAC frame processing unit 210.

As described above, each of the wireless signal processing units 230, 240, and 250 can perform a part of the processing of the MAC layer and the processing of the first layer on the input data or the wireless signal.

Each of the wireless signal processing units 230, 240, and 250 is associated with a traffic identifier (TID). For example, TID #1 is associated with the wireless signal processing unit 230. In this case, the wireless signal processing unit 230 is used for exchanging data relating to TID #1 with the access point 10. Specifically, when the data processing unit 200 receives data addressed to the server 30 relating to TID #1 from the application execution unit 260, the MAC frame processing unit 210 generates a MAC frame including the data and transmits the MAC frame to the access point 10 through the wireless signal processing unit 230. Furthermore, the MAC frame processing unit 210 receives a MAC frame including data relating to TID #1 from the access point 10 through the wireless signal processing unit 230. Information regarding the association of TIDs is included in the link management information 221.

The management unit 220 further includes a mapping unit 224. The mapping unit 224 controls the association of TIDs. For example, the mapping unit 224 transmits a request signal requesting data exchange relating to TID #3 to the access point 10 in response to the receipt of a notification in which a traffic relating to TID #3 will occur from the application execution unit 260 via the data processing unit 200. Upon receiving the response signal to the request signal from the access point 10, the mapping unit 224 changes the TID association so that the LL link is exclusively used for data exchange relating to TID #3. The response signal can be, for example, a type of management frame. The mapping unit 224 will be described in detail later.

The application execution unit 260 performs an application that uses the data input from the data processing unit 200. For example, the application execution unit 260 can display the information of the application on the display 205. Furthermore, the application execution unit 260 may operate based on the operation of the input interface by the user.

In the communication system 1, the wireless signal processing units 130, 140, and 150 of the access point 10 are configured to be connectable to the wireless signal processing units 230, 240, and 250 of the terminal 20, respectively. That is to say, the wireless signal processing units 130 and 230 can be wirelessly connected using the 6 GHz band. The wireless signal processing units 140 and 240 may be wirelessly connected using a 5 GHz band. The wireless signal processing units 150 and 250 may be wirelessly connected using the 2.4 GHz band. In the present specification, the wireless signal processing unit may be referred to as an "STA function".

Figure 7:
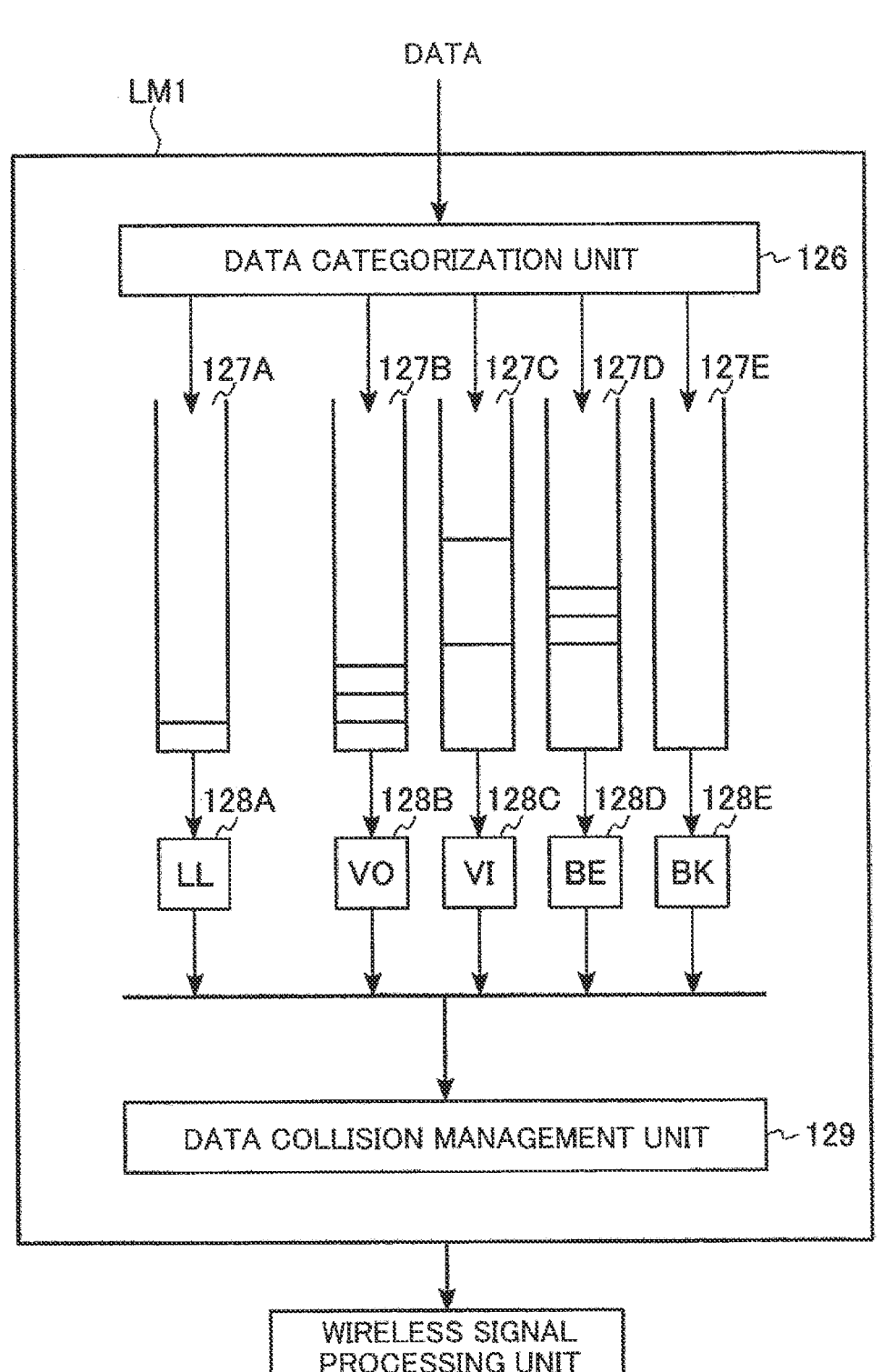
FIG. 7 is a diagram showing a channel access function of the access point shown in FIG. 1.

FIG. 7 shows the channel access function of the link management unit LM1 of the access point 10. The link management unit LM2 of the terminal 20 can have the same channel access function as the link management unit LM1 of the access point 10. Therefore, the description of the channel access function of the link management unit LM2 of the terminal 20 will be omitted.

As shown in FIG. 7, the link management unit LM1 further includes a data categorization unit 126, transmission queues 127A, 127B, 127C, 127D, and 127E, CSMA/CA execution units 128A, 1288, 128C, 128D, and 128E, and a data collision management unit 129. For example, the channel access function is realized using EDCA.

The data categorization unit 126 categorizes the data input from the data processing unit 100 according to the traffic identifier. As the category, for example, "Low Latency (LL)", "Voice (VO)", "Video (VI)", "Best Effort (BE)", and "Background (BK)" are set. LL is applied to data requiring low latency (for example, RTA data). Therefore, it is preferable that the LL data be transmitted in preference to any of the VO, VI, BE, and BK data. For example, the data categorization unit 126 classifies the data relating to a predetermined TID (for example, TID #3) into the category LL.

Furthermore, the data categorization unit 126 inputs the MAC frame including the categorized data to any of the transmission queues 127A to 127E. Specifically, a MAC frame including LL data is input to the transmission queue 127A. A MAC frame including VO data is input to the transmission queue 127B. A MAC frame including VI data is input to the transmission queue 127C. A MAC frame including BE data is input to the transmission queue 127D. A MAC frame including BK data is input to the transmission queue 127E. The MAC frame including the data of each category is stored in the corresponding transmission queue among the transmission queues 127A to 127E.

The CSMA/CA execution units 128A to 128E wait for transmission for a time specified by a preset access parameter while confirming that the wireless signal is not transmitted by another terminal or the like by carrier sense in CSMA/CA. Furthermore, the CSMA/CA execution units 128A to 128E take out MAC frames from the transmission queues 127A to 127E, respectively, and output the taken-out MAC frames to any of the wireless signal processing units 130, 140, and 150 via the data collision management unit 129. Thus, the wireless signal including the MAC frame is transmitted by the wireless signal processing unit (STA function) whose transmission right has been acquired by CSMA/CA.

The CSMA/CA execution unit 128A performs CSMA/CA for the MAC frame including LL data held in the transmission queue 127A. The CSMA/CA execution unit 128B performs CSMA/CA for the MAC frame including VO data held in the transmission queue 127B. The CSMA/CA execution unit 128C performs CSMA/CA for the MAC frame including VI data held in the transmission queue 127C. The CSMA/CA execution unit 128D performs CSMA/CA for the MAC frame including BE data held in the transmission queue 127D. The CSMA/CA execution unit 128E performs CSMA/CA for the MAC frame including BK data held in the transmission queue 127E.

Note that, in EDCA, access parameters are assigned so that transmission of wireless signals is prioritized in the order of, for example, LL, VO, VI, BE, and BK. Access parameters include, for example, CWmin, CWmax, AIFS, and TXOPLimit. CWmin and CWmax indicate a minimum value and a maximum value of a contention window (CW), which is the transmission waiting time for collision avoidance, respectively. An arbitration inter frame space (AIFS) indicates a fixed transmission waiting time set for each access category for collision avoidance control having a priority control function. TXOPLimit indicates an upper limit value of transmission opportunity (TXOP) corresponding to the occupation time of the channel. For example, the shorter the CWmin and CWmax of the transmission queue, the easier it is to obtain transmission rights. The lower the AIFS, the higher the priority of the transmission queue. The amount of data transmitted with one transmission right increases as the value of TXOPLimit increases.

The data collision management unit 129 prevents data collision when a plurality of CSMA/CA execution units acquire transmission rights with the same STA function. Specifically, the data collision management unit 129 adjusts the transmission timing of data in different categories and for which transmission rights have been acquired by the same STA function and transmits a MAC frame including data of a higher priority category to the STA function. For example, the STA function may acquire the transmission right by the CSMA/CA of the transmission queue 127A of the LL at the same time as the STA function acquires the transmission right by the CSMA/CA of any of the other transmission queues 1278 to 127E. In this case, the data collision management unit 129 provides priority to the MAC frame stored in the transmission queue 127A and transmits it to the STA function. Similarly, in the other combinations of transmission queues 1278 to 127E, MAC frames are transmitted in the order based on the priority set in the category. This prevents collisions between data to which transmission is assigned to the same STA function.

Although the form in which the link management units LM1 and LM2 implement the channel access function is described in this embodiment, each STA function may implement the channel access function. When the link management units LM1 and LM2 implement the channel access function, each STA function detects the state (idle/busy) of the wireless channel in the corresponding link and the link management units LM1 and LM2 determine whether the data can be transmitted (for example, which link is used for transmission). On the other hand, when each STA function implements a channel access function, each STA function may independently perform carrier sense and transmit data. At this time, channel access when a plurality of links are used at the same time may be performed by sharing access parameters through interaction between a plurality of STA functions and may be performed by sharing the access parameters by the link management units LM1 and LM2. The access point 10 and the terminal 20 can use a plurality of links at the same time by transmitting data among the plurality of STA functions based on common access parameters.

An example of the operation relating to the multi-link of the communication system 1 will be described below. In the following description, it is assumed that the access point 10 and the terminal 20 establish a multi-link with the two STA functions STA1 and STA2 for the sake of brevity.

Figure 8:
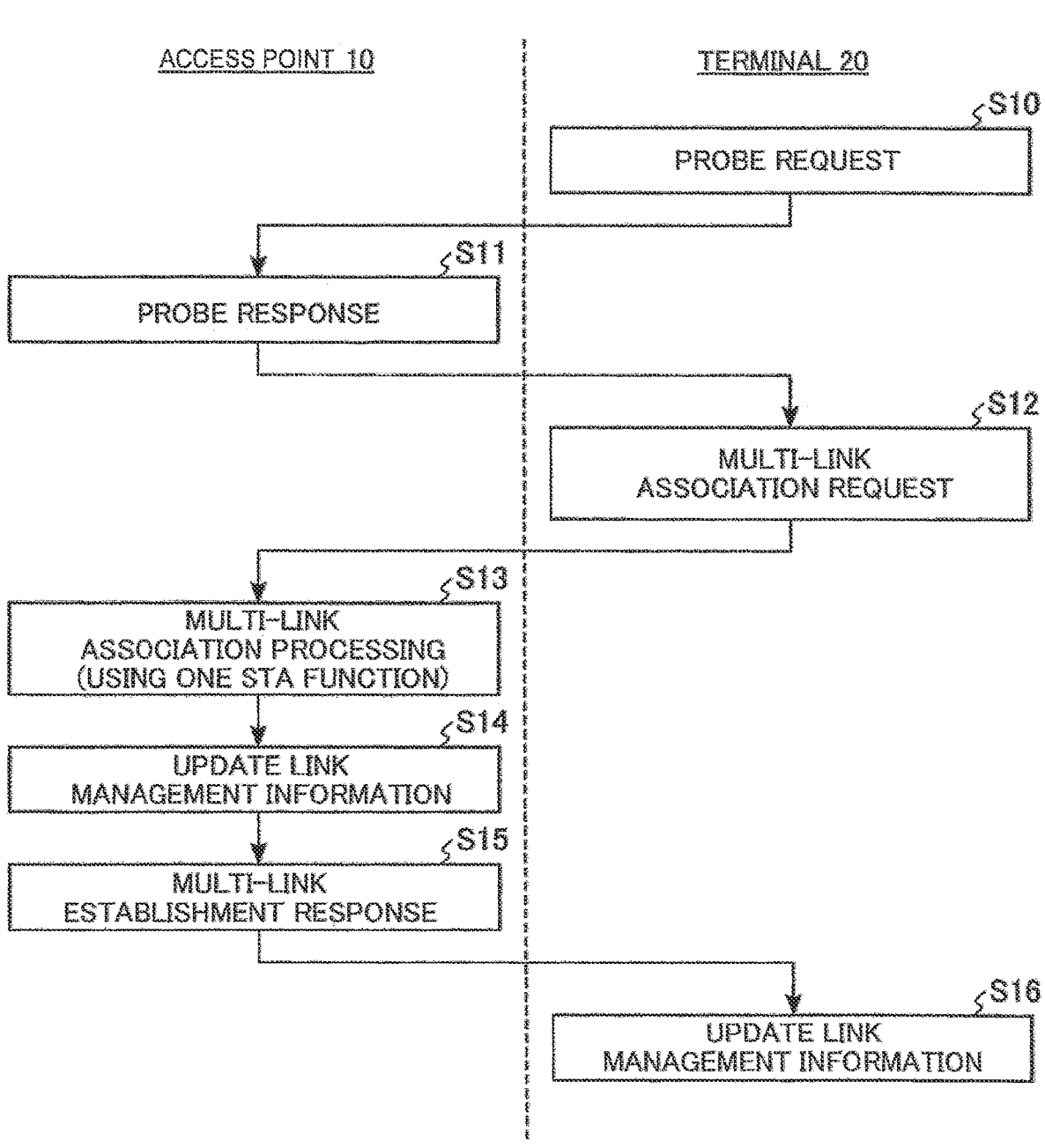
FIG. 8 is a flowchart for describing a multi-link setup in the communication system of FIG. 1.

FIG. 8 schematically shows the procedure of the multi-link setup in the communication system 1.

First, the terminal 20 transmits a probe request to the access point 10 (Step S10 in FIG. 8). The probe request is a signal for confirming whether the access point 10 exists in the vicinity of the terminal 20. The Frame Control field of the probe request contains, for example, "00/0100 (Type value/Subtype value)".

The access point 10 transmits the probe response to the terminal 20 (Step S11) when the access point 10 receives the probe request from the terminal 20. The probe response is a signal used by the access point 10 to respond to a probe request from the terminal 20. The Frame Control field of the probe response contains, for example, "00/0101 (Type value/Subtype value)".

Upon receiving the probe response from the access point 10, the terminal 20 transmits a multi-link association request to the access point 10 via at least one STA function (Step S12). The multi-link association request is a signal for requesting the access point 10 to establish a multi-link. For example, the multi-link association request is generated by the management unit 220 and the MAC frame processing unit 210 of the terminal 20. The Frame Control field of the multi-link association request contains, for example, "00/0000 (Type value/Subtype value)".

Upon receiving the multi-link association request from the terminal 20, the management unit 120 of the access point 10 performs the multi-link association process using one STA function (Step S13). Specifically, the access point 10 performs the association processing of the first STA function with the terminal 20. Furthermore, the management unit 120 performs the association processing of the second STA function by using the first STA function for which the link is established if a wireless connection (link) is established in the first STA function. That is to say, the STA function with an established link is used for the association processing of the STA function with no established link. The access point 10 establishes the multi-link if the association processing of at least two STA functions is completed.

Note that, the multi-link may be established if the link is established in the first STA function. For example, each of the access point 10 and the terminal 20 can provide a notification of the capability of the multi-link, the link which is a target of a multi-link, the operation parameter in each link, and the like before the association processing to collectively perform the association for multi-link. Specifically, the management units 120 and 220 instruct the establishment of the multi-link when the first STA function starts the association and specify the link which is the target of the multi-link. Thus, the management units 120 and 220 perform the association of the links, respectively, and manage these links as a multi-link.

Subsequently, the management unit 120 of the access point 10 updates the link management information 121 (Step S14). Note that, although the process of Step S14 is performed after the two links are established in this example, the link management information 121 may be updated every time the link state is updated or may be updated when the multi-link is established.

The access point 10 transmits a multi-link establishment response to the terminal 20 (Step S15). The multi-link establishment response is a signal used by the access point 10 to respond to a multi-link request from the terminal 20. The Frame Control field of the multi-link establishment response contains, for example, "00/0001 (Type value/Subtype value)". The management unit 220 of the terminal 20 recognizes that the multi-link with the access point 10 has been established based on the reception of the multi-link establishment response.

Upon receiving the multi-link establishment response, the management unit 220 of the terminal 20 updates the link management information 221 (Step S16). That is to say, the terminal 20 records in the link management information 221 in which the multi-link with the access point 10 has been established. Thus, the setup of the multi-link in the communication system 1 according to the embodiment is completed and the data communication using the multi-link becomes possible between the access point 10 and the terminal 20.

The TID-Link mapping in the communication system 1 will be described with reference to FIGS. 9, 10, and 11. In the embodiment, a wireless connection between the access point and the terminal using the channel of the 6 GHz band is called the first link, a wireless connection between an access point and a terminal using a channel in the 5 GHz band is called a second link, and a wireless connection using a 2.4 GHz band channel between an access point and a terminal is called a third link. For example, the first link refers to a link between the wireless signal processing unit 130 of the access point and the wireless signal processing unit 230 of the terminal, the second link refers to the link between the wireless signal processing unit 140 of the access point and the wireless signal processing unit 240 of the terminal, and the third link refers to a link between the wireless signal processing unit 150 of the access point and the wireless signal processing unit 250 of the terminal.

FIG. 9 shows an example of the link management information 221 held by the terminal 20. In FIG. 9, "STA1" represents the wireless signal processing unit 230, "STA2" represents the wireless signal processing unit 240, and "STA3" represents the wireless signal processing unit 250.

As shown in FIG. 9, the link management information 221 includes link information, channel information, multi-link information, and TID information for each of the wireless signal processing units 230, 240, and 250. The link information indicates whether a link with the access point has been established. The link information "presence" indicates that the link has been established, and the link information "none" indicates that the link has not been established. The channel information indicates the channel in use. The multi-link information includes information indicating whether the link constitutes a multi-link. The multi-link information may further include information indicating the attributes of the link. The TID information indicates the TID associated with the link.

In the link management information 221 shown at the upper portion of FIG. 9, the first and second links are established, and these links constitute a multi-link. A link between the wireless signal processing unit 230 and the access point 10 and a link between the wireless signal processing unit 240 and the access point 10 have been established. The first link is set to the anchor link and the second link is set to the LL link. The wireless signal processing unit 230 uses a channel having a channel number of 1, which is a channel in the 6 GHz band. The wireless signal processing unit 240 uses a channel having a channel number of 3, which is a channel in the 5 GHz band. The first link is used for data exchange related to TID #1. TID #1 corresponds to a category other than LL, for example, BE. The second link is used for data exchange related to TID #2. TID #2 corresponds to a category other than LL, for example, VI. The third link has not been established. Therefore, the channel information, the multi-link information, and the TID information regarding the wireless signal processing unit 250 are blank.

Note that one TID may be associated with a plurality of links (a plurality of wireless signal processing units). For example, TID #1 may be associated with both the first link and the second link. In this case, the first link and the second link are used for data exchange related to TID #1.

FIG. 10 shows an example of the link management information 121 held by the access point 10. In FIG. 10, "STA1" represents a wireless signal processing unit 130, "STA2" represents a wireless signal processing unit 140, and "STA3" represents a wireless signal processing unit 150.

As shown in FIG. 10, the link management information 121 includes link information, channel information, multi-link information, terminal information, and TID information for each of the wireless signal processing units 130, 140, and 150. The link information indicates whether a link with at least one terminal has been established. The channel information indicates the channel in use. The multi-link information includes information indicating whether the link constitutes a multi-link. The multi-link information may further include information indicating the attributes set on the link. The terminal information includes identification information that identifies the terminal to which the link is established. In FIG. 10, the identification information a, b, and c represent the terminals 20, 22, and 24 shown in FIG. 1, respectively. The TID information indicates the TID associated with the link. The TID information is set for each of the terminals.

According to the link management information 121 shown at the upper portion of FIG. 10, the first and second links are established, and these links constitute a multi-link. A link between the wireless signal processing unit 130 and the terminals 20, 22, and 24 and a link between the wireless signal processing unit 140 and the terminals 20, 22, and 24 are established. The first link is set to the anchor link and the second link is set to the LL link. The wireless signal processing unit 130 uses the channel having a channel number 1. The wireless signal processing unit 140 uses the channel having a channel number 3. The first link is used for exchanging data relating to TID #1 of the terminal 20, TID #1 of the terminal 22, and TID #1 of the terminal 24. The second link is used for exchanging data relating to TID #2 of the terminal 20 and TID #2 of the terminal 24. The third link has not been established. Specifically, none of the links between the wireless signal processing unit 150 and the terminals 20, 22, and 24 have been established. Thus, the channel information, the multi-link information, the terminal information, and the TID information regarding the wireless signal processing unit 150 are blank.

Figure 11:
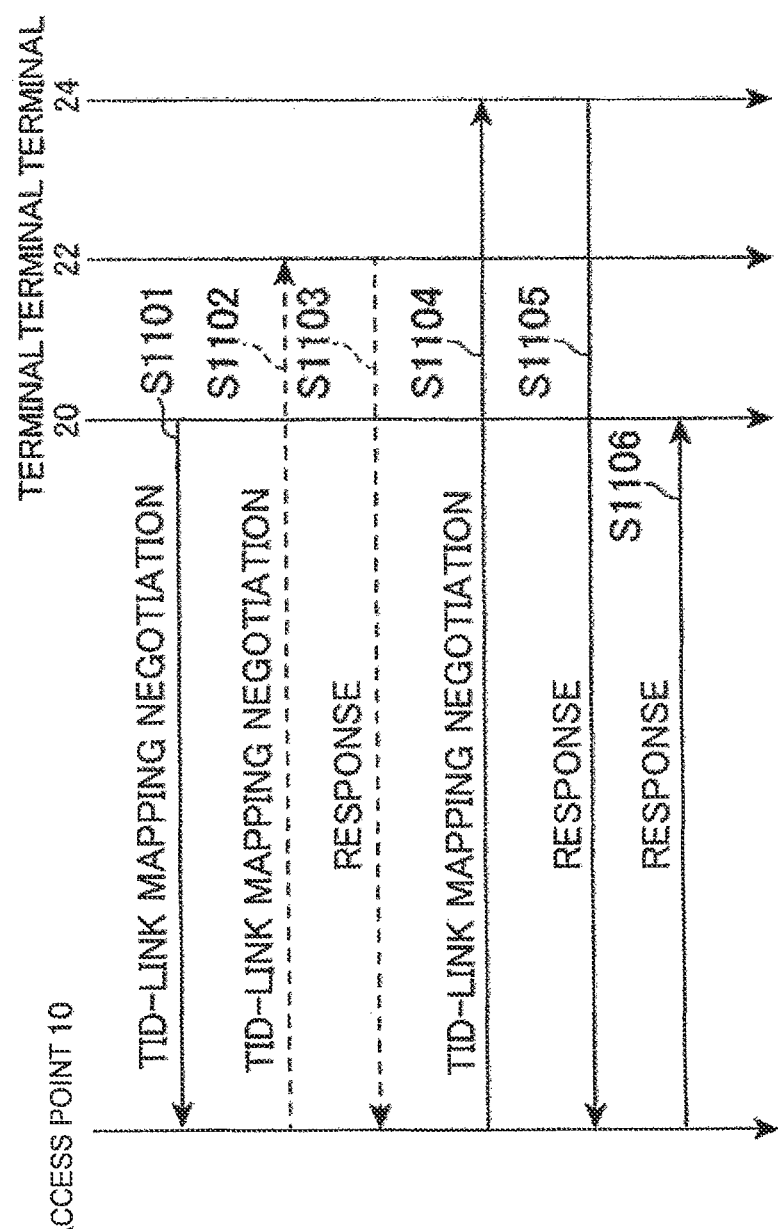
FIG. 11 is a sequence diagram showing TID-Link mapping in the communication system of FIG. 1.

FIG. 11 schematically shows a sequence of TID-Link mapping. The sequence shown in FIG. 11 starts when LL traffic, which is a traffic relating to TID #3, occurs at the terminal 20. It is assumed that the access point 10 holds the link management information 121 shown in the upper portion of FIG. 10 and the terminal 20 holds the link management information 221 shown in the upper portion of FIG. 9 at the time when the LL traffic occurs.

In Step S1101 of FIG. 11, the terminal 20 performs TID-Link mapping negotiation with the access point 10 to reduce the competition latency of the LL traffic. For example, the terminal 20 transmits a request signal requesting data exchange related to TID #3 to the access point 10.

Upon receiving the request signal from the terminal 20, the access point 10 determines to use the second link, which is an LL link, exclusively for data exchange related to TID #3. The access point 10 associates TID #3 with the second link with respect to the terminal 20. Furthermore, the access point 10 changes the association of TID #2 from the second link to the first link with respect to the terminal 20. That is to say, the access point 10 deletes the association between the second link and TID #2 with respect to the terminal 20 and associates TID #2 with the first link.

Subsequently, the access point 10 confirms whether the second link is associated with a TID different from TID #3 (LL traffic) for each of the terminals 22 and 24. The access point 10 recognizes that none of the TIDs are associated with the second link with respect to the terminal 22 and recognizes that the TID #2 is associated with the second link with respect to the terminal 24.

In Step S1104, the access point 10 performs TID-Link mapping negotiation with the terminal 24. Specifically, the access point 10 transmits a request signal to the terminal 24 requesting that the first link be used for data exchange related to TID #2. Upon receiving the request signal from the access point 10, the terminal 24 determines to use the first link for data exchange related to TID #2. The terminal 24 changes the association of TID #2 from the second link to the first link.

In Step S1105, the terminal 24 transmits a response signal to the request signal to the access point 10. Upon receiving the response signal from the terminal 24, the access point 10 changes the association of TID #2 from the second link to the first link with respect to the terminal 24.

In Step S1106, the access point 10 transmits a response signal to the request signal received from the terminal 20 to the terminal 20. Upon receiving the response signal from the access point 10, the terminal 20 associates the TID #3 with the second link and changes the association of the TID #2 from the second link to the first link.

In the example referred to herein, as described above, neither TID is associated with the second link for the terminal 22. Therefore, the access point 10 may omit the TID-Link mapping negotiation (Step S1102) for the terminal 22. The access point 10 performs TID-Link mapping negotiation with the terminal 22 (Step S1102) and receives a response signal from the terminal 22 (Step S1103) in the example in which the second link of the terminal 22 is associated with a TID different from the TID corresponding to the LL traffic.

The procedure shown in FIG. 11 may be modified. For example, the process shown in Step S1106 may be performed between Step S1101 and Step S1102.

The link management information 221 after the TID-Link mapping held by the terminal 20 is shown in the lower portion of FIG. 9. As shown in FIG. 9, TIDs #1 and #2 are associated with the first link and TID #3 is associated with the second link. The first link is used for data exchange relating to TIDs #1 and #2 and the second link is used for data exchange relating to TID #3.

The link management information 121 after the TID-Link mapping held by the access point 10 is shown in the lower portion of FIG. 10. As shown in FIG. 10, with respect to the terminal 20, TIDs #1 and #2 are associated with the first link and TID #3 is associated with the second link. With regard to the terminal 22, TID #1 is associated with the first link. With regard to the terminal 24, TIDs #1 and #2 are associated with the first link. The first link is used for exchanging data relating to TIDs #1 and #2 with the terminal 20, used for exchanging data relating to TID #1 with the terminal 22, and used for exchanging data relating to TIDs #1 and #2 with the terminal 24. The second link is used for exchanging data relating to TID #3 with the terminal 20.

Thus, the second link is exclusively used for data exchange relating to TID #3 in BSS 14 if the traffic relating to TID #3 occurs in the terminal 20.

FIG. 12 schematically shows a Frame Body field in a beacon frame broadcast by access point 10. As shown in FIG. 12, the Frame Body field in the beacon frame includes multi-link (ML) capability information, operational parameters, LL link identifier, and LL traffic information.

The ML capability information indicates whether the multi-link function is supported. For example, the ML capability information "1" indicates that the multi-link function is supported and the ML capability information "0" indicates that the multi-link function is not supported. Operational parameters include information indicating the links which can be used for multi-links and information about each link. The LL link identifier indicates the channel used as the LL link. The LL link identifier corresponds to the identification information that identifies the channel used for data exchange relating to TID #3. In the embodiment in which the beacon signal is transmitted for each channel, the LL link identifier may be information indicating whether the channel to which the beacon signal is transmitted is used as an LL link. The LL traffic information indicates whether an LL traffic (for example, a traffic relating to TID #3) has occurred. The LL traffic information corresponds to the traffic information indicating whether the channel indicated by the LL link identifier is used for the data exchange relating to TID #3.

The beacon management unit 125 analyzes the beacon signal received from the access point 12 shown in FIG. 1. The beacon management unit 125 extracts the LL link identifier and the LL traffic information from the received beacon signal.

The beacon management unit 125 identifies the channel used as the LL link in the access point 12 (or BSS 16) based on the extracted LL link identifier. The beacon management unit 125 determines whether the channel used as the LL link in the access point 12 is the same as the channel used as the anchor link in the access point 10 (or BSS 14). The management unit 120 changes the anchor link to another channel when the channel used as the LL link in the access point 12 is the same as the channel used as the anchor link in the access point 10. For example, the management unit 120 of the access point 10 uses the 3ch as an anchor link when the access point 12 uses the channel 1ch as an LL link. In the embodiment in which a beacon signal is transmitted over a single anchor link, it is possible to prevent the beacon signal from the access point 10 from increasing the latency of the LL traffic when LL traffic occurs in BSS 16.

Similarly, the access point 12 uses a channel different from the channel used as the LL link in the access point 10 as the anchor link. Thus, it is possible to prevent the beacon signal from the access point 12 from increasing the latency of the LL traffic when the LL traffic occurs in the BSS 14.

The beacon management unit 125 determines whether LL traffic has occurred in the BSS 16 based on the extracted LL traffic information. When the beacon management unit 125 detects that LL traffic has occurred in the BSS 16, the mapping unit 124 determines whether a TID different from the TID corresponding to the LL traffic is associated with the link of the own station corresponding to the channel used for the LL link in the BSS 16. When the link is associated with TID #2, which is different from the TID corresponding to LL traffic, the mapping unit 124 changes the association of TID #2 from this link to another link. This eliminates or reduces the occurrence of latency due to competition. As a result, the communication latency between the access point and the terminal in BSS 16 is improved.

The access point 12 operates in the same manner as the access point 10 when LL traffic occurs in BSS 14. As a result, the communication latency between the access point and the terminal in BSS 14 is improved.

Figure 13:
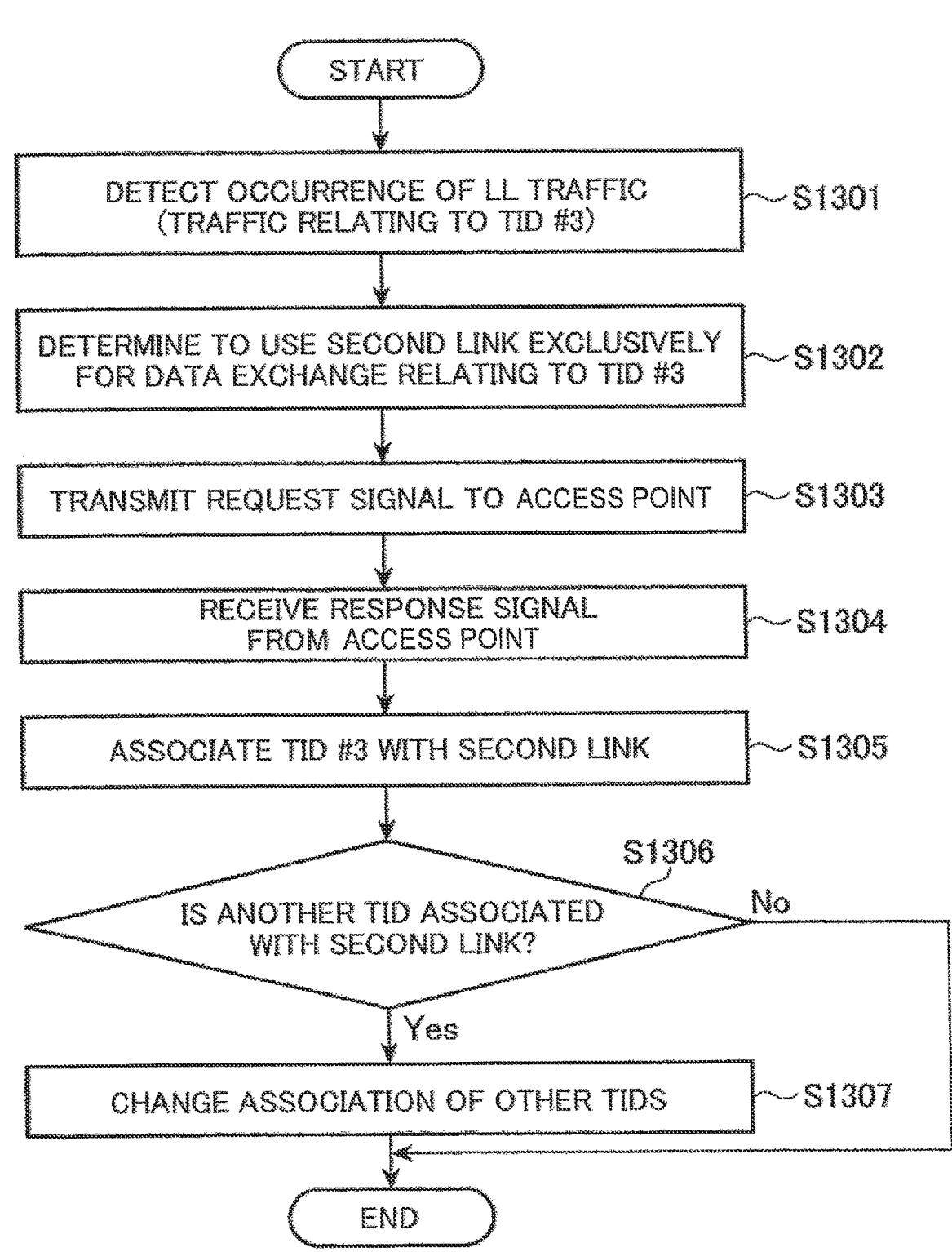
FIG. 13 is a flowchart for describing the TID-Link mapping performed using the terminal shown in FIG. 1.

FIG. 13 schematically shows a procedure example of TID-Link mapping in the terminal 20. Here, it is assumed that the multi-link setup between the access point 10 and the terminal 20 has been completed as shown in the link management information 221 shown at the upper portion of FIG. 9.

In Step S1301 of FIG. 13, the data processing unit 200 detects that the LL traffic, which is the traffic related to TID #3, has occurred. For example, when the data processing unit 200 receives a notification in which an LL traffic will occur, from the application execution unit 260, the data processing unit 200 notifies the mapping unit 224 of the management unit 220 of the occurrence of the LL traffic.

In Step S1302, the mapping unit 224 determines to use the second link, which is an LL link, exclusively for data exchange related to TID #3.

In Step S1303, the mapping unit 224 performs TID-Link mapping negotiation with the access point 10. Specifically, the mapping unit 224 transmits a request signal requesting data exchange relating to TID #3 to the access point 10.

In Step S1304, the mapping unit 224 receives a response signal to the request signal from the access point 10.

In Step S1305, the mapping unit 224 associates TID #3 with the second link.

In Step S1305, the mapping unit 224 determines whether another TID is associated with the second link. When it is determined that the other TID is not associated with the second link (Step S1306; No), the process ends.

When it is determined that the other TID is associated with the second link (Step S1306; Yes), the process proceeds to Step S1307. In Step S1307, the mapping unit 224 changes the association of other TIDs. For example, the mapping unit 224 recognizes that TID #2 is associated with the second link and changes the association of TID #2 from the second link to the first link.

Figure 14:
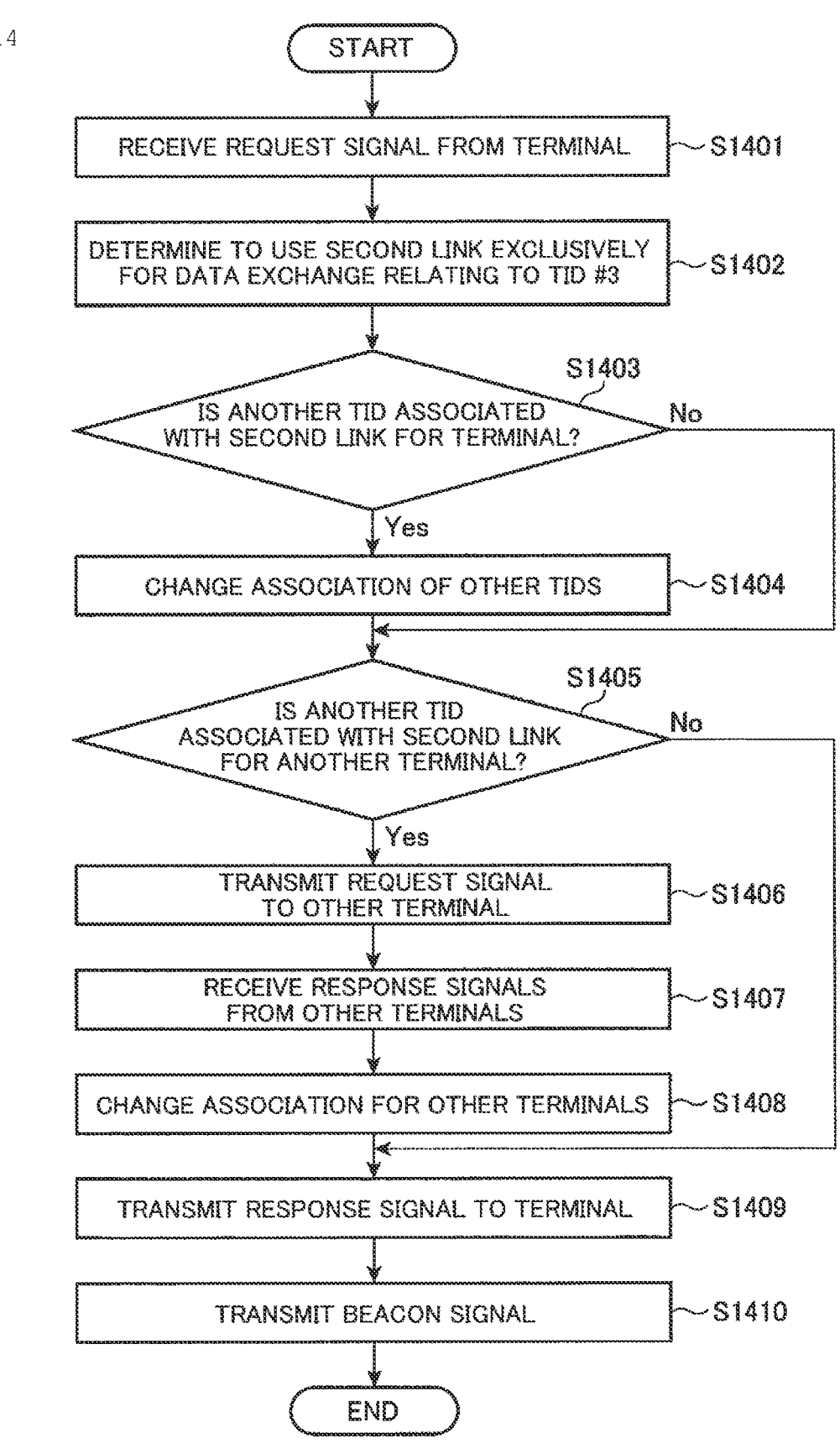
FIG. 14 is a flowchart for describing the TID-Link mapping performed using the access point shown in FIG. 1.

FIG. 14 schematically shows a procedure example of TID-Link mapping in the access point 10. Here, it is assumed that the setup of the multi-link between the access point 10 and the terminals 20, 22, and 24 is completed as shown in the link management information 121 shown at the upper portion of FIG. 10.

In Step S1401 of FIG. 14, the mapping unit 124 receives a request signal requesting data exchange related to TID #3 from the terminal 20.

In Step S1402, the mapping unit 124 determines that the second link set in the LL link is used exclusively for data exchange relating to TID #3. For example, the mapping unit 124 associates TID #3 with the second link with respect to the terminal 20.

In Step S1403, the mapping unit 124 determines whether another TID is associated with the second link with respect to the terminal 20. When the other TID is not associated with the second link (Step S1403; No), the process proceeds to Step S1405.

When it is determined that the other TID is associated with the second link (Step S1403; Yes), the process proceeds to Step S1404. In Step S1404, the mapping unit 124 changes the association of other TIDs. For example, the mapping unit 124 recognizes that TID #2 is associated with the second link and changes the association of TID #2 from the second link to the first link.

In Step S1405, the mapping unit 124 determines whether another TID is associated with the second link with respect to the other terminal. When it is determined that the other TID is not associated with the second link (Step S1405; No), the process proceeds to Step S1409.

When it is determined that the other TID is associated with the second link (Step S1405; Yes), the process proceeds to Step S1406. In Step S1406, the mapping unit 124 transmits a request signal requesting to change the association of the other TID to the other terminal. For example, the mapping unit 124 recognizes that the TID #2 is associated with the second link with respect to the terminal 24 and transmits a request signal to the terminal 24 requesting that the first link be used for data exchange related to TID #2. Upon receiving the request signal from the access point 10, the terminal 24 determines to use the first link for data exchange related to TID #2 and changes the association of TID #2 from the second link to the first link. Subsequently, the terminal 24 transmits a response signal to the request signal to the access point 10.

In Step S1407, the mapping unit 124 receives the response signal from the terminal 24.

In Step S1408, the mapping unit 124 changes the association of TID #2 from the second link to the first link with respect to the terminal 24.

In Step S1409, the mapping unit 124 transmits a response signal to the request signal received from the terminal 20 to the terminal 20.

In Step S1410, the beacon management unit 125 periodically transmits a beacon signal in which information indicating that there is LL traffic is stored in the LL traffic field.

As described above, in the communication system 1, when the traffic related to TID #3 occurs in the terminal 20, the terminal 20 transmits a request signal requesting data exchange relating to TID #3 to the access point 10. The access point 10 associates TID #3 with the LL link when the access point 10 receives the request signal from the terminal 20. Furthermore, the access point 10 changes the association of other TIDs from the LL link to the other link when another TID (for example, TID #1) is associated with the LL link. The access point 10 transmits a response signal to the terminal 20. The terminal 20 associates TID #3 with the LL link if receiving the response signal from the access point 10. In addition, when another TID (for example, TID #1) is associated with the LL link, the terminal 20 changes the association of the other TID from the LL link to another link. Thus, the LL link is used for selectively exchanging data relating to TID #3 between the access point 10 and the terminal 20. As a result, the data related to TID #3 is transmitted or received between the access point 10 and the terminal 20 with low latency. The communication latency relating to LL traffic between the access point 10 and the terminal 20 is improved.

When TID #1 is associated with an LL link for the terminal 22, the access point 10 transmits a request signal to the terminal 22 requesting that another link be used for data exchange regarding TID #1. The terminal 22 changes the association of TID #1 from the LL link to another link when receiving the request signal from the access point 10. The terminal 22 transmits a response signal to the access point 10. The access point 10 changes the association of TID #1 from the LL link to another link when receiving the response signal from the terminal 22. This prevents the LL link from being used for data exchange relating to TID #1 between the access point 10 and the terminal 22. As a result, the data relating to TID #3 is transmitted or received between the access point 10 and the terminal 20 with lower latency. The communication latency relating to LL traffic between the access point 10 and the terminal 20 is further improved.

The access point 10 transmits a beacon signal including an LL link identifier indicating a channel used as an LL link and LL traffic information indicating whether LL traffic has occurred. The access point 12 neighboring the access point 10 receives the beacon signal from the access point 10.

The access point 12 sets the anchor link as a link of a channel different from the channel indicated by the LL link identifier included in the beacon signal. Thus, it is possible to prevent the beacon signal from the access point 12 from increasing the latency of the LL traffic when the LL traffic occurs in the BSS 14. As a result, the communication latency regarding the LL traffic between the access point 10 and the terminal 20 is further improved.

The access point 12 determines whether LL traffic has occurred in the BSS 14 based on the LL traffic information included in the beacon signal. The access point 12 determines whether another TID (for example, TID #2) is associated with the link of the own station corresponding to the channel indicated by the LL link identifier when it is detected that LL traffic has occurred in the BSS 14. The access point 12 changes the association of the TID #2 to another link when the TID #2 is associated with the access point 12. This eliminates or reduces the occurrence of latency due to competition. As a result, the communication latency regarding the LL traffic between the access point 10 and the terminal 20 is further improved.

In the above embodiment, an example in which the access point 10 and the terminal 20 each include three wireless signal processing units and the multi-link is composed of two links has been described. The multi-link may be composed of three links. In another embodiment, the access point 10 and the terminal 20 may each include four or more wireless signal processing units.

In the embodiments described above, the STA functions are configured to transmit and receive wireless signals using channels of different frequency bands from each other. In other embodiments, the STA functions may be configured to transmit and receive wireless signals using different channels belonging to the same frequency band. For example, the wireless signal processing unit 130 may be configured to transmit and receive wireless signals using the first channel in the 6 GHz band and configured so that the wireless signal processing unit 140 transmits/receives a wireless signal using a second channel in the 6 GHz band. In this case, the first channel and the second channel may each include a plurality of channels as long as they do not overlap.

The function unit of the access point 10 involved in wireless communication may be implemented by an independent wireless device such as a chip. For example, the MAC frame processing unit 110, the management unit 120, and the wireless signal processing units 130, 140, and 150 shown in FIG. 4 may be implemented by an independent wireless device (for example, the wireless communication module 104 shown in FIG. 3) and, the wireless device is integrated into the substrate of the access point 10 when the access point 10 is produced. The wireless apparatus may refer to the access point 10 or may refer to a wireless device which realizes a function unit of the access point 10 involved in wireless communication.

The function unit of the terminal 20 involved in wireless communication may be implemented by an independent wireless device such as a chip. For example, the MAC frame processing unit 210, the management unit 220, and the wireless signal processing units 230, 240, and 250 shown in FIG. 6 may be implemented by an independent wireless device (for example, the wireless communication module 204 shown in FIG. 5) and, the wireless device is incorporated into the substrate of the terminal 20 when the terminal 20 is produced. The wireless apparatus may refer to the terminal 20 or may refer to a wireless device which realizes a function unit of the terminal 20 involved in wireless communication.

At least a part of the above-mentioned processing may be realized by the processor executing a program (computer executable instruction). The program may be provided to a computer (for example, access point 10 or terminal 20) in a state of being stored in a computer-readable storage medium. In this case, for example, the computer further includes a drive (not shown) for reading data from the storage medium and acquires the program from the storage medium. Examples of storage media include magnetic disks, optical discs (CD-ROM, CD-R, DVD-ROM, DVD-R, and the like), magneto-optical discs (MO and the like), and semiconductor memories. Furthermore, the program may be stored in a server (not shown) on the network NW so that the computer downloads the program from the server.

Note that the present invention is not limited to the above embodiment and can be variously modified at the implementation stage without departing from the gist thereof. In addition, each embodiment may be carried out in combination as appropriate, and in that case, the combined effect can be obtained. Furthermore, the above-described embodiment includes various inventions and various inventions can be extracted by a combination selected from a plurality of disclosed components. For example, if the problem can be solved and the effect can be obtained even if some components are deleted from all the components shown in the embodiment, the configuration in which these components are deleted can be extracted as an invention.

REFERENCE SIGNS LIST

1 Communication system
10, 12 Access point
20, 22, 24, 26 Terminal
30 Server
101 CPU
102 ROM
103 RAM
104 Wireless communication module
105 Wired communication module
100 Data Processing unit
110 MAC frame processing unit
120 Management unit
121 Link management information 122 Association processing unit
123 Authentication processing unit
124 Mapping unit
125 Beacon Management unit
126 Data categorization unit
127A to 127E Transmission queue
128A to 128E CSMA/CA execution unit
129 Data collision management unit
130, 140, 150 Wireless signal processing unit
201 CPU
202 ROM
203 RAM
204 Wireless communication module
205 Display
206 Storage
200 Data processing unit
210 MAC frame processing unit
220 Management unit
221 Link management information
222 Association processing unit
223 Authentication processing unit
224 Mapping unit
230, 240, 250 Wireless signal processing unit
260 Application execution unit

The invention claimed is:

1. A wireless apparatus comprising:
wireless communication circuitry comprising first wireless communication circuitry configured to transmit and receive a wireless signal using a first channel and second wireless communication circuitry configured to transmit and receive a wireless signal using a second channel different from the first channel; and
processing circuitry configured to:
manage a first link being a link between the first wireless communication circuitry and a first terminal, a second link being a link between the second wireless communication circuitry and the first terminal, the second link being set to a link exclusively used for data exchange relating to a first traffic identifier when there is traffic relating to the first traffic identifier, a third link being a link between the first wireless communication circuitry and a second terminal, and a fourth link being a link between the second wireless communication circuitry and the second terminal;
receive a first request signal requesting data exchange relating to the first traffic identifier from the first terminal;
associate the first traffic identifier with the second link based on the first request signal;
when a second traffic identifier different from the first traffic identifier is associated with the second link, change the association of the second traffic identifier from the second link to the first link based on the first request signal; and
when a third traffic identifier different from the first traffic identifier is associated with the fourth link, transmit a second request signal requesting to change the association of the third traffic identifier from the fourth link to the third link to the second terminal based on the first request signal.

2. The wireless apparatus according to claim 1, wherein the processing circuitry is further configured to transmit a beacon signal including identification information identifying a channel used for data exchange relating to the first traffic identifier.

3. The wireless apparatus according to claim 2, wherein the beacon signal further includes traffic information indicating whether the channel indicated by the identification information is being used for data exchange relating to the first traffic identifier.

4. A communication method performed by a wireless apparatus including first wireless communication circuitry configured to transmit and receive a wireless signal using a first channel and second wireless communication circuitry configured to transmit and receive a wireless signal using a second channel different from the first channel, the communication method comprising:

managing a first link being a link between the first wireless communication circuitry and a first terminal, a second link being a link between the second wireless communication circuitry and the first terminal, the second link being set to a link exclusively used for data exchange relating to a first traffic identifier when there is traffic relating to the first traffic identifier, a third link being a link between the first wireless communication circuitry and a second terminal, and a fourth link being a link between the second wireless communication circuitry and the second terminal;

receiving a first request signal requesting data exchange relating to the first traffic identifier from the first terminal;

associating the first traffic identifier with the second link based on the first request signal;

when a second traffic identifier different from the first traffic identifier is associated with the second link, changing the association of the second traffic identifier from the second link to the first link based on the first request signal; and when a third traffic identifier different from the first traffic identifier is associated with the fourth link, transmitting a second request signal requesting to change the association of the third traffic identifier from the fourth link to the third link to the second terminal based on the first request signal.

* * * * *